US012602904B2

(12) United States Patent
Moon et al.

(10) Patent No.: US 12,602,904 B2
(45) Date of Patent: Apr. 14, 2026

(54) METHOD AND ELECTRONIC DEVICE FOR RECOGNIZING OBJECT BASED ON MASK UPDATES

(71) Applicant: ELECTRONICS AND TELECOMMUNICATIONS RESEARCH INSTITUTE, Daejeon (KR)

(72) Inventors: Ye-Bin Moon, Daejeon (KR); Tae-Hyun Oh, Daejeon (KR); Yongjin Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 271 days.

(21) Appl. No.: 18/517,809

(22) Filed: Nov. 22, 2023

(65) Prior Publication Data

US 2024/0177451 A1    May 30, 2024

(30) Foreign Application Priority Data

Nov. 29, 2022    (KR) ........................ 10-2022-0162470

(51) Int. Cl.
  *G06V 10/74*        (2022.01)
  *G06V 10/26*        (2022.01)
      (Continued)

(52) U.S. Cl.
  CPC ............ *G06V 10/761* (2022.01); *G06V 10/26* (2022.01); *G06V 10/751* (2022.01); *G06V 10/7715* (2022.01)

(58) Field of Classification Search
  CPC .... G06V 10/761; G06V 10/26; G06V 10/751; G06V 10/7715; G06V 10/764;
      (Continued)

(56) References Cited

U.S. PATENT DOCUMENTS

| | | | |
|---|---|---|---|
| 11,238,596 B1 * | 2/2022 | Gadde ................. | G06V 30/274 |
| 2005/0271273 A1 | 12/2005 | Blake et al. | |

(Continued)

FOREIGN PATENT DOCUMENTS

| | | |
|---|---|---|
| KR | 101094896 B1 | 12/2011 |
| KR | 20190106698 A | 9/2019 |

(Continued)

OTHER PUBLICATIONS

Bao et al. "CNN in MRF: Video Object Segmentation via Inference in A CNN-Based Higher-Order Spatio-Temporal MRF" Proceedings of the IEEE Conference on Computer Vision and Pattern Recognition (CVPR), 2018, pp. 5977-5986 (Year: 2018).*

(Continued)

*Primary Examiner* — Ming Y Hon
(74) *Attorney, Agent, or Firm* — Rabin & Berdo, P.C.

(57)        ABSTRACT

A method of recognizing an object based on mask updates is provided. The method includes generating first result information in which a foreground and background of a predetermined input image have been separated from each other, generating second result information in which the results of the object recognition within the input image and a boundary portion of the object have been matched, calculating an objective function to be applied to each mask head based on the first and second result information and parameter information for the first and second result information, updating all of the mask heads based on the objective function, and performing object recognition based on the updated mask.

8 Claims, 9 Drawing Sheets

(51) Int. Cl.
  *G06V 10/75* (2022.01)
  *G06V 10/77* (2022.01)

(58) Field of Classification Search
  CPC ...... G06V 10/82; G06V 10/85; G06V 10/469;
  G06V 10/96; G06T 7/194
  See application file for complete search history.

(56) References Cited

U.S. PATENT DOCUMENTS

| | | | |
|---|---|---|---|
| 2015/0181112 A1 | 6/2015 | Oh et al. | |
| 2015/0243324 A1* | 8/2015 | Sandrew | H04N 13/266 |
| | | | 386/278 |
| 2021/0365724 A1* | 11/2021 | Lee | G06T 7/73 |
| 2022/0044366 A1* | 2/2022 | Zhang | G06N 3/08 |
| 2022/0237832 A1* | 7/2022 | Williams | G06F 18/24133 |
| 2022/0261593 A1 | 8/2022 | Yu et al. | |
| 2023/0099494 A1* | 3/2023 | Kocamaz | G06V 20/58 |
| | | | 382/103 |
| 2023/0102954 A1* | 3/2023 | Yang | G06T 7/0012 |
| | | | 382/159 |
| 2023/0368508 A1* | 11/2023 | Deng | G06V 10/7788 |
| 2024/0177451 A1* | 5/2024 | Moon | G06V 10/764 |
| 2025/0292439 A1* | 9/2025 | Glaeser | G06T 11/00 |

FOREIGN PATENT DOCUMENTS

| | | |
|---|---|---|
| KR | 20210002104 A | 1/2021 |
| KR | 20210153291 A | 12/2021 |

OTHER PUBLICATIONS

Linchao Bao, et al., "CNN in MRF: Video Object Segmentation via Inference in a CNN-Based Higher-Order Spatio-Temporal MRF", pp. 5977-5986, CVPR(Jun. 2018).

* cited by examiner

FIG. 2

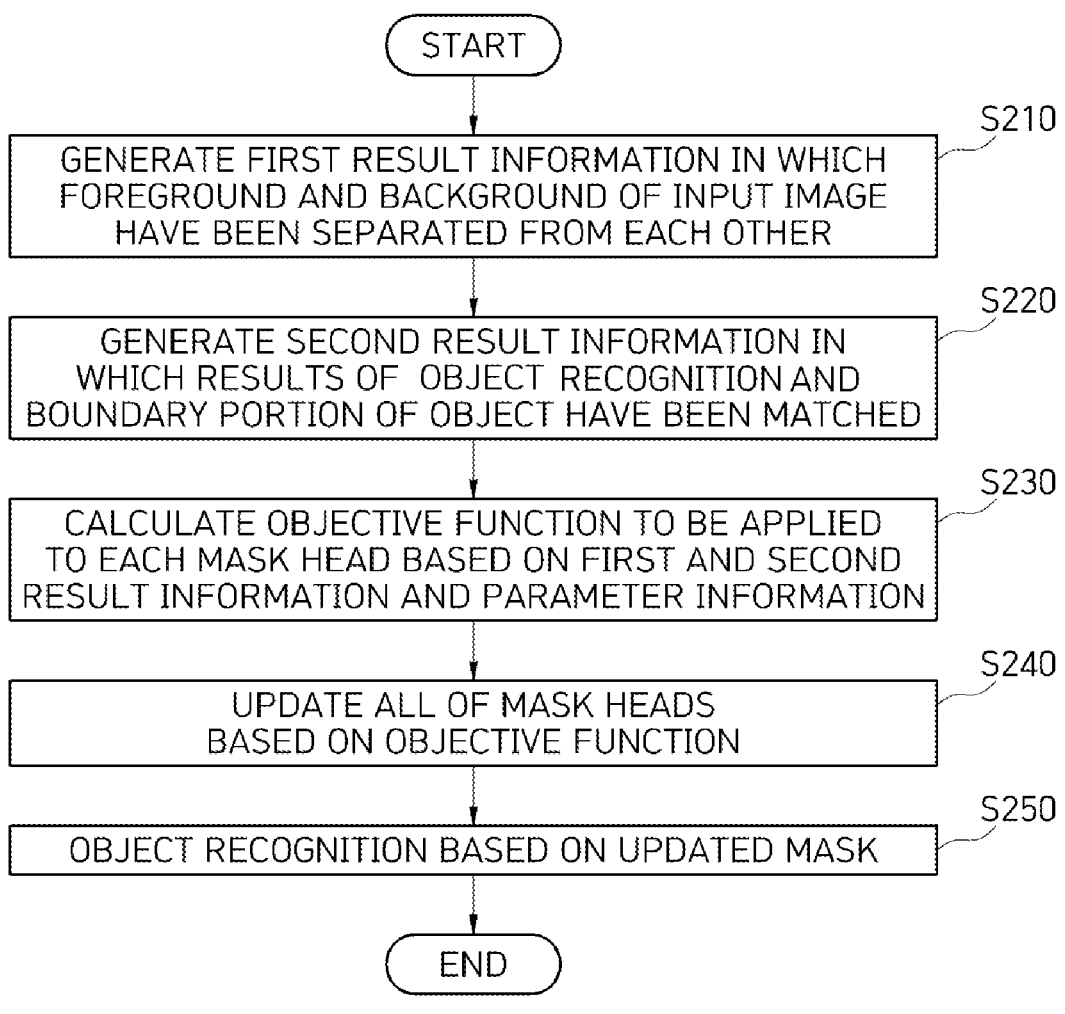

START

S210
GENERATE FIRST RESULT INFORMATION IN WHICH FOREGROUND AND BACKGROUND OF INPUT IMAGE HAVE BEEN SEPARATED FROM EACH OTHER

S220
GENERATE SECOND RESULT INFORMATION IN WHICH RESULTS OF OBJECT RECOGNITION AND BOUNDARY PORTION OF OBJECT HAVE BEEN MATCHED

S230
CALCULATE OBJECTIVE FUNCTION TO BE APPLIED TO EACH MASK HEAD BASED ON FIRST AND SECOND RESULT INFORMATION AND PARAMETER INFORMATION

S240
UPDATE ALL OF MASK HEADS BASED ON OBJECTIVE FUNCTION

S250
OBJECT RECOGNITION BASED ON UPDATED MASK

END

FIG. 6C
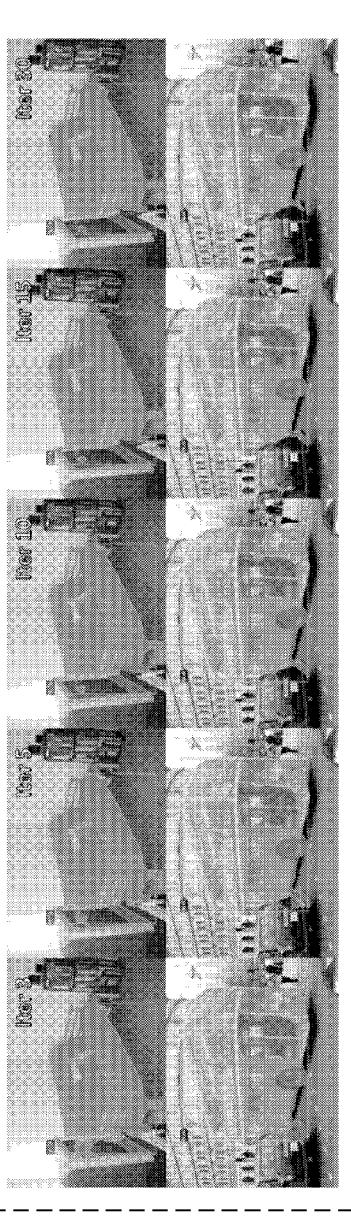
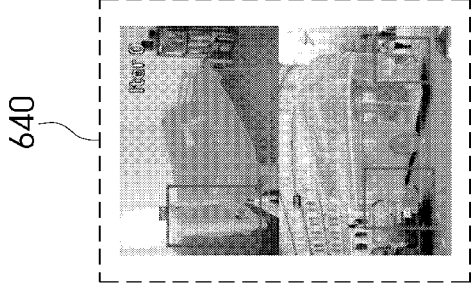
640

710

720

METHOD AND ELECTRONIC DEVICE FOR RECOGNIZING OBJECT BASED ON MASK UPDATES

CROSS-REFERENCE TO RELATED APPLICATION

This application claims priority to and the benefit of Korean Patent Application No. 10-2022-0162470, filed on Nov. 29, 2022, the disclosure of which is incorporated herein by reference in its entirety.

BACKGROUND

1. Technical Field

The present disclosure relates to a method and electronic device for recognizing an object based on mask updates.

2. Related Art

An object recognition task is an essential field for understanding an image like a human being in visual intelligence research. The object recognition task is an issue to recognize the location of each individual object that appears in an input image at the pixel level. The results of object recognition may be directly used in techniques, such as an autonomous vehicle and a robot due to its importance, or may be used in a pre-processing process for specifically understanding the image like a human being.

A conventional object recognition method requires an excellent artificial intelligence model or a large amount of training data in order to obtain the high-quality results of the object recognition. Although these condition are satisfied, inaccurate results are frequently derived depending on complexity the of an object recognition task.

Furthermore, in the case of a restrictive condition such as an embedded environment or training setups in which it is difficult to include a large amount of training data, there is a problem in that it is difficult to obtain the high-quality results of the object recognition.

SUMMARY

Various embodiments are directed to providing a method and electronic device for recognizing an object based on mask updates, which repeatedly refine the results of the object recognition by using a Markov random field (MRF) model when an object recognition task is performed by using an artificial intelligence model, such as a deep artificial neural network.

According to an embodiment of the present disclosure, refined results of the object recognition can be derived by repeatedly refining initial results of object recognition in a test phase without a process of preparing a large amount of additional training data sets or re-training/fine-tuning the object recognition model, which are typically required to improve performance.

However, objects of the present disclosure to be achieved are not limited to the aforementioned object, and other objects may be present.

A method of recognizing an object based on mask updates according to a first aspect of the present disclosure includes generating first result information in which the foreground and background of a predetermined input image have been separated from each other, generating second result information in which the results of the object recognition within the input image and a boundary portion of the object have been matched, calculating an objective function to be applied to each mask head based on the first and second result information and parameter information for the first and second result information, updating all of the mask heads based on the objective function, and performing object recognition based on the updated mask.

Furthermore, an electronic device for recognizing an object according to a second aspect of the present disclosure includes a communication unit configured to receive a predetermined image, memory in which a program for updating a mask based on a preset objective function with respect to the predetermined input image is stored, and a processor configured to generate first result information in which the foreground and background of the input image have been separated from each other, generate second result information in which the results of the object recognition within the input image and a boundary portion of the object have been matched, calculate an objective function to be applied to each mask head based on the first and second result information and parameter information for the first and second result information, update all of the mask heads, and perform object recognition based on the updated mask, by executing the program stored in the memory.

Furthermore, a method of recognizing an object based on mask updates according to a third aspect of the present disclosure includes receiving an a image including predetermined recognition target object, extracting a first feature map by passing the input image through a backbone network, extracting a second feature map by passing the first feature map through a feature pyramid network, updating a mask object recognition based on a for controller head corresponding to the second feature map, and performing the object recognition on the second feature map based on the updated mask. In this case, the updating of the mask for object recognition based on the controller head corresponding to the second feature map includes updating the mask based on an objective function for calculating first result information in which the foreground and background of the input image have been separated from each other and second result information in which the results of the object recognition within the input image and a boundary portion of the object have been matched.

A computer program according to another aspect of the present disclosure executes the method of recognizing an object based on mask updates, and is stored in a computer-readable recording medium.

Other details of the present disclosure are included in the detailed description and the drawings.

According to an embodiment of the present disclosure, further refined results of the object recognition can be generated by using the feature-level MRF model, that is, intermediate results of the object recognition model. Furthermore, there is an advantage in that a higher convergence speed can be expected because the results of the object recognition are refined through parameter updates of a mask head not the refinement of the results of object recognition themselves.

Effects of the present disclosure which may be obtained in the present disclosure are not limited to the aforementioned effects, and other effects not described above may be evidently understood by a person having ordinary knowledge in the art to which the present disclosure pertains from the following description.

BRIEF DESCRIPTION OF THE DRAWINGS

FIG. 2 is a flowchart of an object recognition method according to an embodiment of the present disclosure.

FIG. 6C is a diagram illustrating the results of the object recognition to which an embodiment of the present disclosure has been applied.

DETAILED DESCRIPTION

Figure 1:
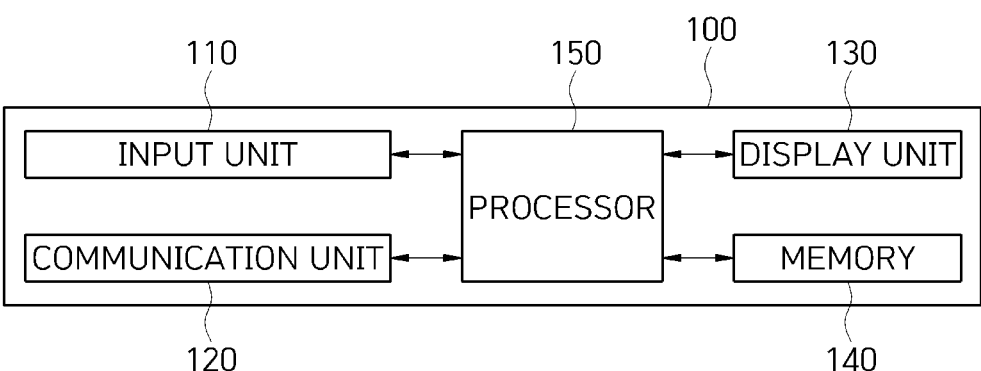
FIG. 1 is a diagram for describing an electronic device 100 according to an embodiment of the present disclosure.

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. "And/or" includes each of mentioned elements and all combinations of one or more of mentioned elements. Although the terms "first", "second", etc. are used to describe various components, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

Hereinafter, in order to help understanding of those skilled in the art, a proposed background of the present disclosure is first described and an embodiment of the present disclosure is then described in detail.

The existing approach method for performing an object recognition task is as follows.

First, an elaborate artificial intelligence model for object recognition and a large amount of training data sets $\mathcal{D}$ to be used when the artificial intelligence model is trained are prepared. In this case, each element of the training data set $\mathcal{D}$ consists of a pair $(I, \mathcal{A}_I)$ of an image I and the results $\mathcal{A}_I$ of the object recognition within the image I that has been directly written by a human being.

With respect to a predefined recognition target class set $\mathcal{C}$, the results $\mathcal{A}$ of object recognition include a pair $(c_i, m_i)$ $(1 \leq i \leq N_I)$ of information $(c_i \in \mathcal{C})$ indicating which class each of $N_I$ objects appearing in the image I belongs to and pixel-level recognition information $(m_i)$, which indicates where is each of the $N_I$ objects located within the image.

In a training phase, an initial artificial intelligence model is repeatedly updated so that the results of the object recognition output by the artificial intelligence model are close to $$_c\mathcal{A}_I = \{(c_i, m_i)\}_{i=1}^{N_I},$$

that is, the results of object recognition that have been written by a human being, by using each image I of the training data set $\mathcal{D}$ as an input. In a test phase, an object recognition task is performed on an arbitrary image by using the artificial intelligence model that has been trained as described above.

In a conventional technology, an elaborate artificial intelligence model and a large amount of training data sets are required to obtain the high-quality results of the object recognition. However, in the case of the conventional technology, erroneous results of the object recognition may be frequently output because the complexity of an object recognition task itself is high.

Furthermore, it may be difficult to obtain an artificial intelligence model or training data set of the necessary quality due to problems such as time and costs. For example, only an object recognition model having a small size may be used on hardware having a restriction condition, such as embedded hardware. In this case, it may be difficult to obtain the high-quality results of the object recognition due to the limitation of the artificial intelligence model itself.

As another example, it may be difficult to generate a training data set itself of the necessary quality because just generating the training data set is very labor-intensive. Alternative methods, such as a low-shot learning method in which a very small number of examples are used to train the artificial intelligence model in order to recognize an object of a new class, and a weakly-supervised learning method in which a training data set containing only noisy or restrictive information are used to train the artificial intelligence model, correspond to such an example. Such methods have inevitably low object recognition performance.

As described above, in a situation in which it is inevitably difficult to obtain the high-quality results of the object it is necessary to refine the results of the object recognition by introducing an additional refinement process in a test phase.

Hereinafter, an electronic device 100 for recognizing an object according to an embodiment of the present disclosure is described with reference to FIG. 1.

FIG. 1 is a diagram for describing an electronic device 100 according to an embodiment of the present disclosure.

The electronic device 100 according to an embodiment of the present disclosure includes an input unit 110, a communication unit 120, a display unit 130, memory 140, and a processor 150.

The input unit 110 generates input data in response to a user input to the electronic device 100. The user input may include a user input relating to data to be processed by the electronic device 100. The input unit 110 includes at least one input means. The input unit 110 may include a key board, a key pad, a dome switch, a touch panel, a touch key, a mouse, and a menu button.

The communication unit 120 transmits and receives data between internal components or performs communication with an external device, such as an external server. That is, the communication unit 120 may receive a predetermined image from a camera or an external server or device, or may transmit and receive other required data. The communica- tion unit 120 may include both a wired communication module and a wireless communication module. The wired communication module may be implemented by a power line communication device, a telephone line communication device, cable home (MoCA), Ethernet, IEEE1294, an inte- grated wired home network, or an RS-485 controller. Fur- thermore, the wireless communication module may be con- structed as a module for implementing a function, such as a wireless LAN (WLAN), Bluetooth, an HDR WPAN, UWB, ZigBee, impulse radio, a 60 GHZ WPAN, binary-CDMA, a wireless USB technology, a wireless HDMI technology, $5^{th}$ generation (5G) communication, long term evolution-ad- vanced (LTE-A), long term evolution (LTE), or wireless fidelity (Wi-Fi).

The display unit 130 displays display data according to an operation of the electronic device 100. The display unit 130 includes a liquid crystal display (LCD), a light emitting diode (LED) display, an organic light-emitting diode (OLED) display, a micro electro mechanical systems (MEMS) display, and an electronic paper display. The display unit 130 may be implemented as a touch screen in combination with the input unit 110.

The memory 140 stores programs for updating a mask based on a preset objective function with respect to a predetermined input image. In this case, the memory 140 commonly refers to a nonvolatile storage device that retains information stored therein although power is not supplied to the nonvolatile storage device and a volatile storage device. For example, the memory 120 may include NAND flash memory such as a compact flash (CF) card, a secure digital (SD) card, a memory stick, a solid-state drive (SSD), and a micro SD card, a magnetic computer memory device such as a hard disk drive (HDD), and an optical disc drive such as CD-ROM and DVD-ROM.

The processor 150 may control at least another compo- nent (e.g., a hardware or software component) of the client device 100 by executing software, such as a program, and may perform various data processing or operations.

Hereinafter, a method of recognizing an object based on mask updates, which is performed by the electronic device 100 according to an embodiment of the present disclosure, is described with reference to FIGS. 2 to 5.

Figure 3:
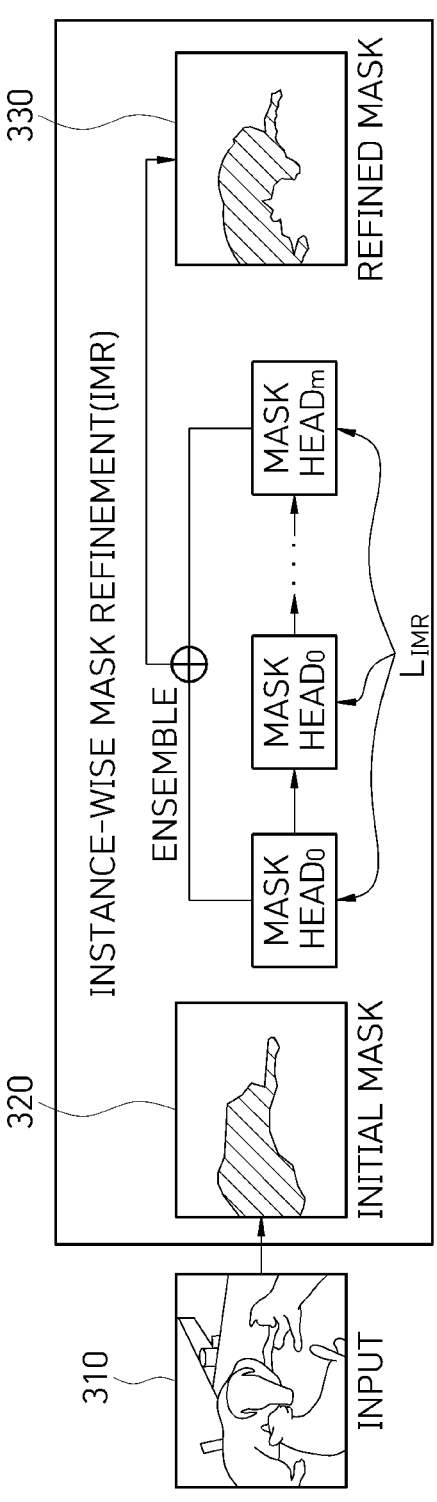
FIG. 3 is a diagram for describing an example of an object recognition method according to an embodiment of the present disclosure.

FIG. 2 is a flowchart of an object recognition method according to an embodiment of the present disclosure. FIG. 3 is a diagram for describing an example of an object recognition method according to an embodiment of the present disclosure.

In an embodiment of the present disclosure, in order to more clearly distinguish between the foreground and back- ground of an image, test time optimization that repeatedly refines the results of the object recognition by using a Markov random field (MRF) model is used. In this case, the test time optimization means a process for being matched with a boundary portion of a corresponding object without a process of changing an object recognition model, such as re-training or fine-tuning.

Specifically, in an embodiment of the present disclosure, for the test time optimization, the following objective func- tion is defined like Equation 1.

$$L_{IMR} = \mu_1 L_{unary} + \mu_2 L_{pairwise} \qquad (1)$$

In Equation 1, $\mu_1$ and $\mu_2$ are parameters for balancing two detailed terms $L_{unary}$ and $L_{pairwise}$. The objective function $L_{IMR}$ is used by updating the parameter w of a mask head.

Specifically, in an embodiment of the present disclosure, first, first result information $L_{unary}$ in which the foreground and background of a predetermined input image have been separated from each other is generated (S210).

$$L_{unary} = \sum_{x \notin G} \eta S_x^{fg} \cdot (1 - \tilde{m}_x(w)) + S_x^{bg} \cdot \tilde{m}_x(w) \qquad (2)$$

In order to generate the first result information in Equa- tion 2, in an embodiment of the present disclosure, first similarity and second similarity may be calculated. The first result information may be generated by applying initial results of the object recognition in each pixel of the input image to the first and second similarities.

In this case, the first similarity means similarity between a feature vector that is obtained by passing through a first layer of the mask head in each pixel of the input image and a foreground prototype. The second similarity means simi- larity between the feature vector and a background proto- type.

This is described based on Equation 2. In Equation 2, x means each pixel of an image I, $\eta$ means a parameter for balancing, and $\tilde{m}_x(w)$ means the initial results of object recognition.

$$S_x^{fg}$$

means the first similarity between a feature vector $\hat{f}_x$ that is obtained by passing through the first layer of the mask head in the pixel x and a foreground prototype $p_{fg}$.

In this case, the foreground prototype may be expressed like Equation 3.

$$p_{fg} = \frac{1}{|\{x \in I\}|} \sum_{x \in I} \hat{f}_x \cdot \tilde{m}_x(w) \qquad (3)$$

Furthermore, the first similarity is calculated like Equa- tion 5 by using a similarity function, such as Equation 4.

$$sim_\kappa(f, f') = \exp\left(-\frac{1}{\kappa}\|f - f'\|_2^2\right) \qquad (4)$$

$$S_x^{fg} = sim_{0.05}(\hat{f}_x, p_{fg}) \qquad (5)$$

$$S_x^{bg}$$

is the second similarity between the feature vector $\hat{f}_x$ that is obtained by passing through the first layer of the mask head in the pixel x and a background prototype $p_{bg}$. The second similarity may be expressed like Equation 6.

$$S_x^{bg} = sim_{0.05}(\hat{f}_x, p_{bg}) \qquad (6)$$

The background prototype $p_{bg}$ in Equation 6 may be calculated as follows. First, assuming that a background pixel is present in the edge of a bounding box $\check{b}_x$ of each object, a foreground error of the pixel x that is located in the circumference of the bounding box $\check{b}_x$ is calculated by using Equation 7.

$$E_x^{fg} = \|\hat{f}_x - p_{fg}\|_2^2 \qquad (7)$$

Thereafter, a pixel set for a predetermined number is extracted in order that the calculated foreground error is higher. The background prototype is calculated based on a feature vector for the extracted pixel set.

As an embodiment, assuming that a set of upper five pixels in which the foreground error frequently occurs is $\mathcal{V}$, the background prototype may be calculated like Equation 8.

$$p_{bg} = \frac{1}{5}\sum_{x \in V} \hat{f}_x \qquad (8)$$

Furthermore, in Equation 2, $\mathcal{G}$ means a set of pixels in which both the foreground error in Equation 7 and a background error in Equation 9 indicate high values, and consists of a set of pixels in which a minimum value $$g_x = \min(E_x^{fg}, E_x^{bg}) \qquad$$

between the foreground error and the background error is greater than a predetermined threshold ρ. The first result information may be finally generated by applying information of the set of corresponding pixels to the first similarity.

$$E_x^{bg} = \|\hat{f}_x - p_{bg}\|_2^2 \qquad (9)$$

Next, second result information ($L_{pairwise}$) in which the results of object recognition within the input image and the boundary portion of the object have been matched is generated (S220).

$L_{pairwise}$, that is, the second result information, is for obtaining elaborate recognition results by matching the results of object recognition with the boundary portion of the object, and may be expressed like Equation 10.

$$L_{pairwise} = \sum_x \sum_{x' \in \mathcal{N}_x} W_{x,x'} \|\tilde{m}_x(w) - \tilde{m}_{x'}(w)\|_2^2 \qquad (10)$$

As an embodiment, the second result information may be generated by generating a set of pixels that neighbors a predetermined pixel that enters the mask head as an input, calculating third similarity between the predetermined pixel and neighboring pixels within the generated set of pixels, and then matching the results of the recognition and boundary portion of the object based on whether the third similarity is greater than the predetermined threshold.

This is described with reference to Equation 10. In Equation 10, $\mathcal{N}_x$ illustrates a set of eight pixels x' that neighbor the predetermined pixel x. Furthermore, $w_{xx'}$ means a weight value that is determined based on feature similarity (i.e., the third similarity) between the two pixels x and x'. In this case, the third similarity is calculated like Equation 11. The weight value may be determined according to Equation 12.

$$S_{x,x'} = sim_{0.2}(f_x, f_{x'}) \qquad (11)$$

$$W_{x,x'} = S_{x,x'} \ (S_{x,x'} > \text{the predetermined threshold (e.g., 0.5)})$$

$$W_{x,x'} = 0 (S_{x,x'} \leq \text{the threshold}) \qquad (12)$$

In this case, $f_x$ means the feature vector of the pixel x that enters the mask head as an input.

Next, the objective function $L_{IMR}$ according to Equation 1, which will be applied to each mask head, is calculated based on the first and second result information and parameter information w for the first and second result information (S230).

Thereafter, all of the mask heads are updated based on the objective function (S240). That is, the mask heads are repeatedly updated starting from an initial mask head (mask head$_0$) based on the defined objective function.

Object recognition is performed based on the mask that has been updated by forming an ensemble of all of the mask heads that have been repeated and obtained as described above (S250). That is, the results of object recognition can be refined by updating the mask by considering all of a plurality of mask heads mask head$_0$, mask head$_1$, . . . , mask head$_m$ and performing recognition based on the corresponding mask.

Figure 4:
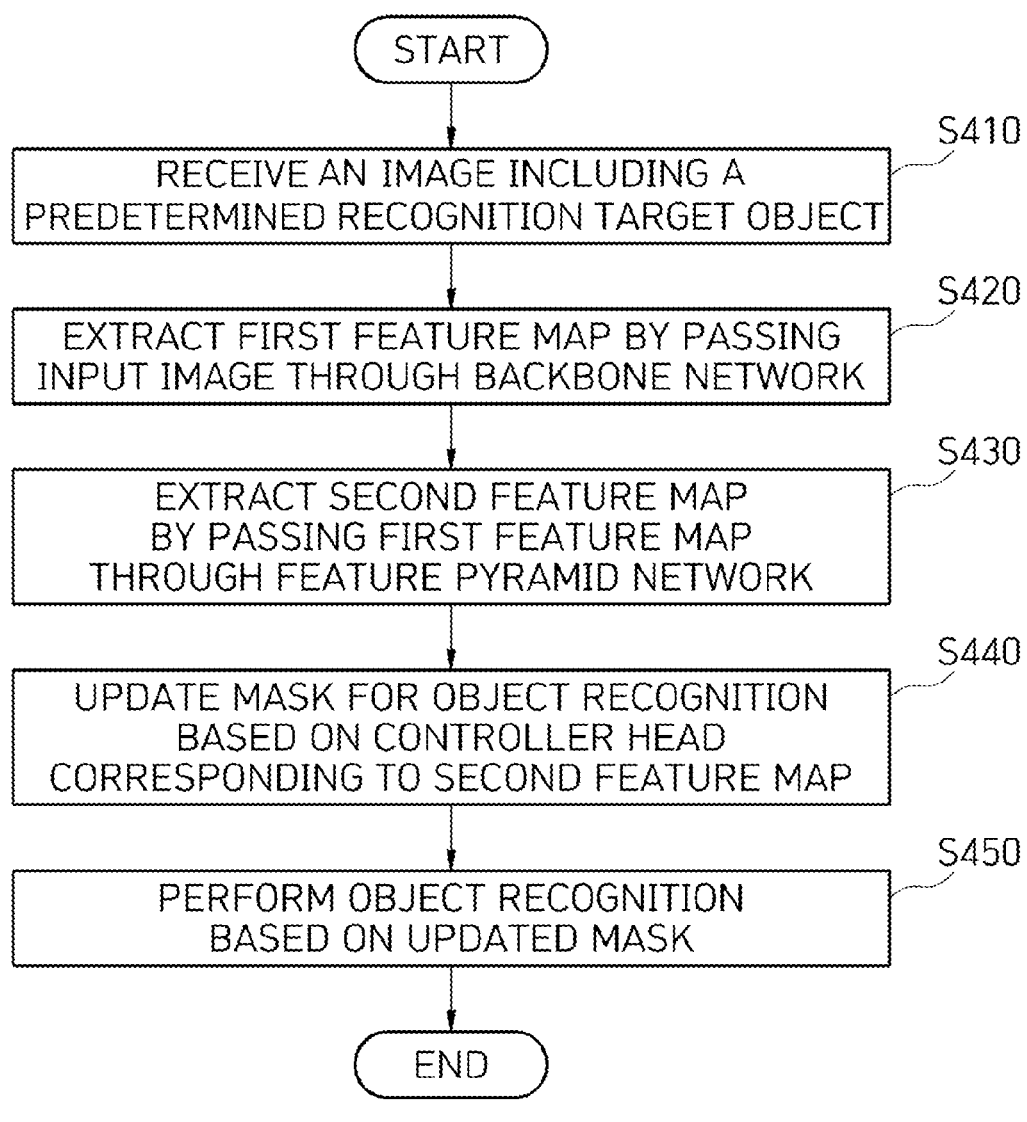
FIG. 4 is a flowchart of an object recognition method in another embodiment of the present disclosure.
Figure 5:
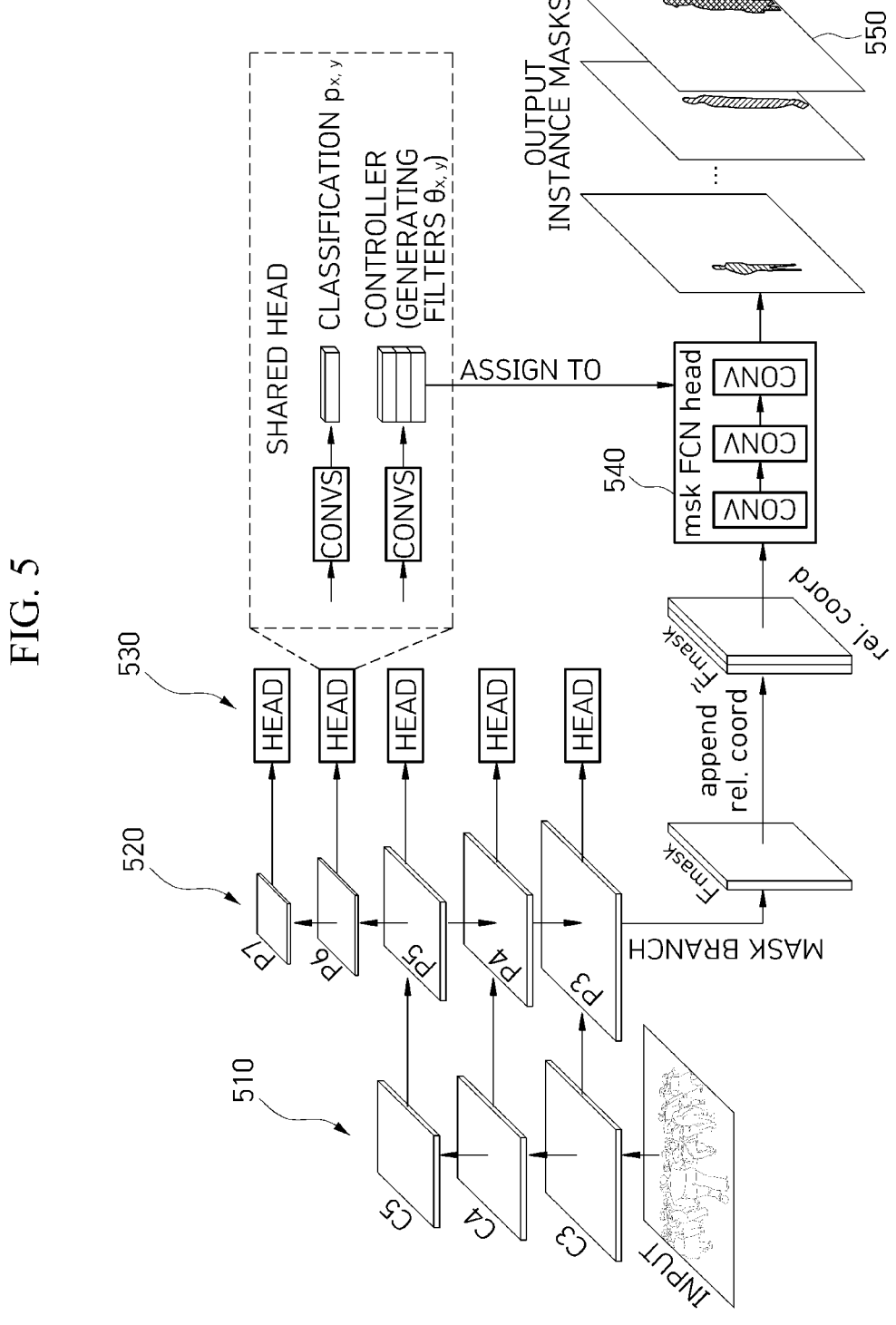
FIG. 5 is a diagram for describing an embodiment in which an object recognition model is applied in an embodiment of the present disclosure.

FIG. 4 is a flowchart of an object recognition method in another embodiment of the present disclosure. FIG. 5 is a diagram for describing an embodiment in which an object recognition model is applied in an embodiment of the present disclosure.

In the object recognition method according to another embodiment of the present disclosure, object recognition may be performed by applying the object recognition model illustrated in FIG. 5.

First, when an image including a predetermined recognition target object is input (S410), a first feature map is extracted by passing the input image through a backbone network (S420). As an embodiment, in step S420, an ResNet-50-based backbone network may be applied. The first feature maps extracted in step S420 correspond to C3, C4, and C5 in FIG. 5. C3, C4, and C5, that is, the first feature maps, illustrate feature maps having different types of resolution, which may be extracted from the backbone network.

Next, a second feature map is extracted by passing the first feature map through a feature pyramid network (FPN) (S430). The second feature maps extracted in step S430 correspond to P3 to P7 in FIG. 5.

As an embodiment, the second feature map P5 may be extracted by applying a 1×1 convolution layer to the first feature map C5. Furthermore, each of the second feature maps P3 and P4 may be extracted by applying the 1×1 convolution layer and the up-sampling results of each of the second feature map P4 and P5 to each of the first feature maps C3 and C4. Furthermore, each of the second feature maps P6 and P7 may be extracted by applying the 1×1 convolution layer to each of the second feature maps P5 and P6.

Next, a mask for object recognition is updated based on a controller head corresponding to the second feature map (S440). Object recognition is performed on the second feature map based on the updated mask (S450).

That is, the controller head for object recognition, which has been added to each of the second feature maps P3 to P7 obtained in FIG. 5, may be used to set the parameter of a mask head for object recognition. The mask can be updated through such parameter setting.

Furthermore, the results of each object recognition that appears in a corresponding image may be output by passing, through a plurality of convolution layers and an object-wise mask head, results that are obtained by up-sampling the second feature maps P4 and P5 and adding the up-sampling results to the second feature map P3.

In an embodiment of the present disclosure, in step S240 of updating the mask, as described with reference to FIGS. 2 and 3, the mask can be updated based on the objective function for calculating the first result information in which the foreground and background of the input image have been separated from each other and the second result information in which the results of the object recognition within the input image and the boundary portion of the object have been matched.

In the aforementioned description, each of steps S210 to S450 may be further divided into additional steps or the steps may be combined into smaller steps depending on an implementation example of the present disclosure. Furthermore, some of the steps may be omitted, if necessary, and the sequence of the steps may be changed. Furthermore, although contents are omitted, the contents described with reference to FIG. 1 and the contents described with reference to FIGS. 1 to 5 may be applied to each other.

Hereinafter, application effects of the present disclosure are described with reference to FIGS. 6A to 7B.

Figure 6A:
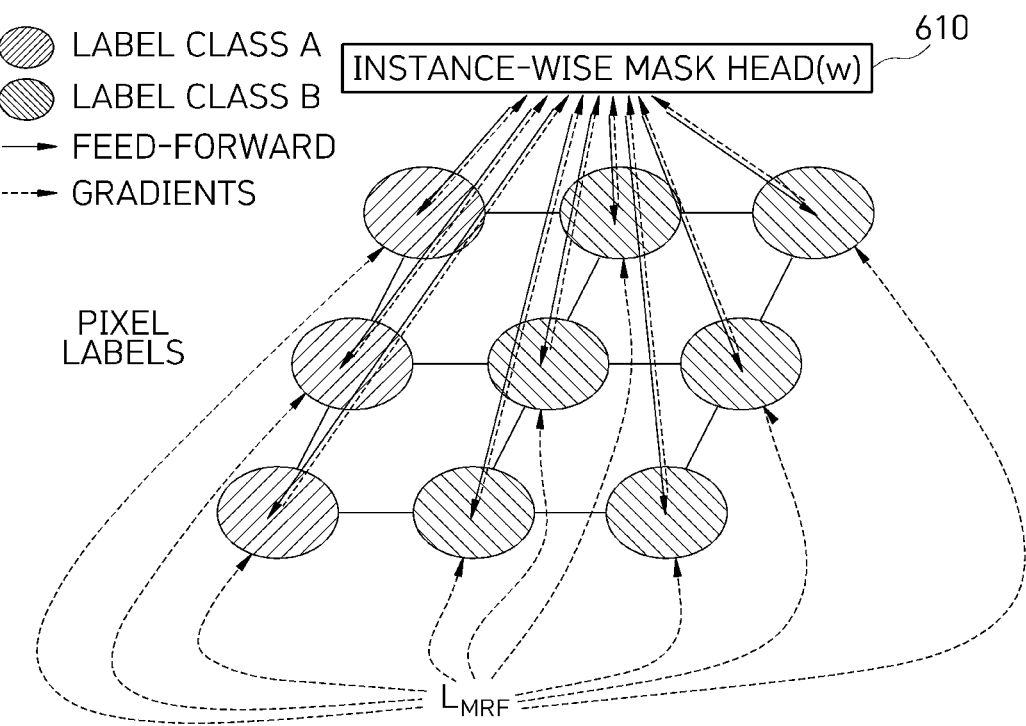
FIG. 6A is a diagram illustrating an MRF-based test time optimization process in a feature map level in an embodiment of the present disclosure.
Figure 6B:
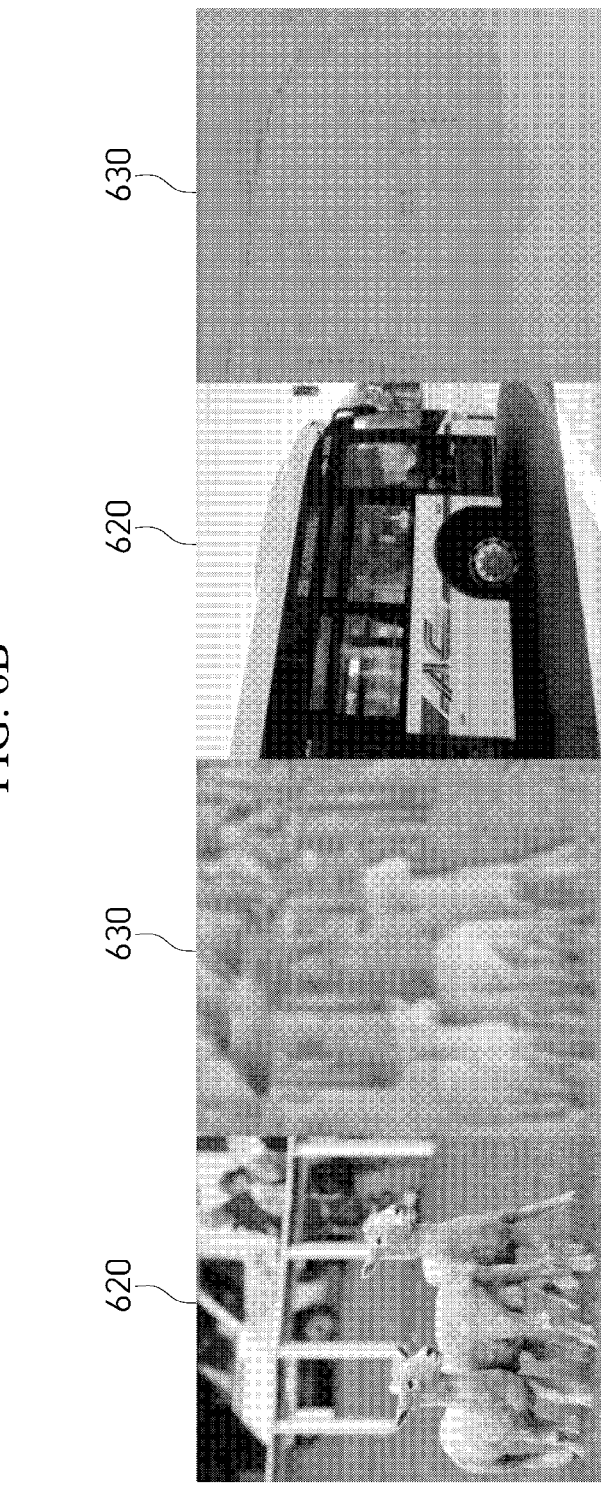
FIG. 6B is a diagram illustrating the visualization results of an input image and an input feature map of a mask head.

FIG. 6A is a diagram illustrating an MRF-based test time optimization process in a feature map level in an embodiment of the present disclosure. FIG. 6B is a diagram illustrating visualization results of an input image and an input feature map of a mask head. FIG. 6C is a diagram illustrating the results of the object recognition to which an embodiment of the present disclosure has been applied.

In an embodiment of the present disclosure, as illustrated in FIG. 6A, the parameter w 610 of a mask head is repeatedly optimized by using the MRF model in a feature map unit not a pixel unit of an image. Such a method according to an embodiment of the present disclosure has two advantages.

First, the MRF model having a feature map unit can have further refined results of the object recognition compared to an MRF model having a pixel unit because a feature map, that is, intermediate results of an object recognition model, clearly preserves the boundary of each object. FIG. 6B is a diagram illustrating the visualization of an input image and an input feature map of a mask head. In the original image 620, a boundary between different objects frequently becomes unclear due to a change in hue, intensity, or saturation. In contrast, it can be seen that in a feature map 630, the boundary of each object clearly appears even in an unclear boundary portion.

Second, there is an effect in that the convergence speed is increased because the results of the object recognition are refined by updating the parameter of a mask head without directly improving the results of object recognition themselves. FIG. 6C is for describing the results of the object recognition to which an embodiment of the present disclosure has been applied. It may be seen that a case in which an object is recognized as being excessively large (e.g., box areas on the left side of a sofa and a bus) or recognized as being smaller than an actual object (e.g., a box area on the right side of the bus) in initial results (iter 0, 640) obtained from an object recognition model has been refined through the present disclosure. Most of modifications in FIG. 6C are performed within five steps. This indicates that the object recognition refinement speed of the present disclosure is very high.

Figure 7A:
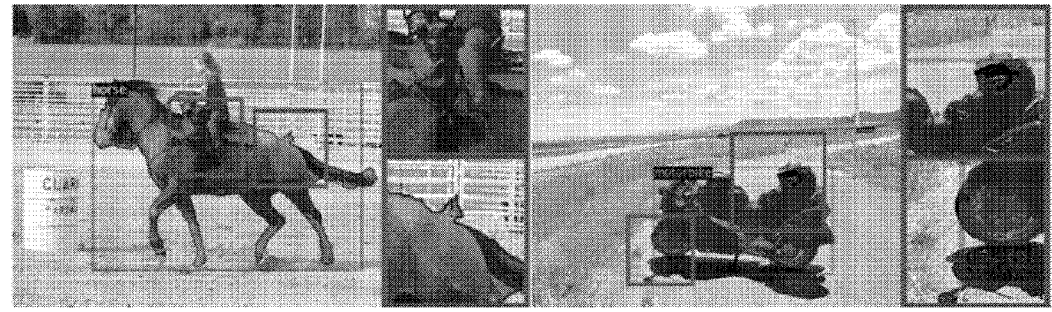
FIG. 7A is a diagram illustrating the results of the object recognition based on low shot learning.
Figure 7B:
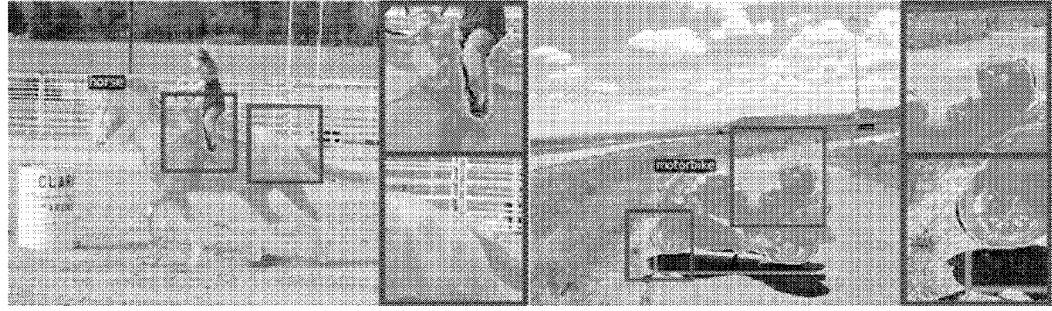
FIG. 7B is a diagram illustrating the results of the object recognition to which an embodiment of the present disclosure has been applied.

FIG. 7A is a diagram illustrating the results of the object recognition based on low shot learning. FIG. 7B is a diagram illustrating the results of the object recognition to which an embodiment of the present disclosure has been applied.

As illustrated in FIG. 7A, in the case of a low shot learning-based object recognition model, the results of the object recognition 710 inevitably have low performance because the object recognition model is trained by using only a very small number of examples. It may be seen from FIG. 7A that the object is recognized as being excessively large or small as indicated in the box area.

In contrast, FIG. 7B illustrates results refined by the present disclosure. It may be seen that the high-quality results of the object recognition can be obtained without a phenomenon in which the object is recognized as being excessively large or small.

The method of recognizing an object based on mask updates according to an embodiment of the present disclosure may be implemented in the form of a program (or application) in order to be executed by being combined with a computer, that is, hardware, and may be stored in a medium.

The aforementioned program may include a code coded in a computer language, such as C, C++, JAVA, Ruby, or a machine language which is readable by a processor (CPU) of a computer through a device interface of the computer in order for the computer to read the program and execute the methods implemented as the program. Such a code may include a functional code related to a function, etc. that defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The medium in which the method is stored means a medium that semi-permanently stores data and that is readable by a device, not a medium that stores data for a short moment like a register, a cache, or memory. Specifically, examples of the medium in which the method is stored include a ROM, a RAM, a CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A method of recognizing an object based on mask updates, the method being performed by a computer and comprising:

generating first result information in which a foreground and background of a predetermined input image have been separated from each other;

generating second result information in which results of an object recognition within the input image and a boundary portion of the object have been matched;

calculating an objective function to be applied to each of mask heads based on the first and second result information and parameter information for the first and second result information;

updating all of the mask heads based on the objective function; and performing object recognition based on the updated mask heads, wherein the generating of the first result information comprises:

calculating first similarity between a feature vector that is obtained by passing through a first layer of a mask head and a foreground prototype in each pixel of the input image;

calculating second similarity between the feature vector and a background prototype; and generating the first result information by applying initial results of object recognition in each pixel of the input image to the first and second similarities.

2. The method of claim 1, wherein the calculating of the second similarity between the feature vector and the background prototype comprises:

calculating a foreground error of a pixel that is located in a circumference of a bounding box of each object;

extracting a set of pixels having a predetermined number in order that the calculated foreground error is high; and calculating the background prototype based on a feature vector of the set of extracted pixels.

3. The method of claim 1, wherein the generating of the first result information by applying the initial results of object recognition in each pixel of the input image to the first and second similarities comprises applying information on a set of pixels in which a minimum value between a foreground error and a background error is greater than a predetermined threshold to the calculated first similarity.

4. The method of claim 1, wherein the generating of the second result information in which the results of object recognition within the input image and the boundary portion of the object have been matched comprises:

generating a set of pixels that neighbor a predetermined pixel that enters the mask head as an input;

calculating third similarity between the predetermined pixel and neighboring pixels within the generated set of pixels; and matching the results of object recognition and the boundary portion based on whether the calculated third similarity is greater than a predetermined threshold.

5. An electronic device for recognizing an object, comprising:

a communication unit configured to receive a predetermined input image;

memory in which a program for updating a mask based on a preset objective function with respect to the predetermined input image is stored; and a processor configured to generate first result information in which a foreground and background of the input image have been separated from each other, generate second result information in which results of an object recognition within the input image and a boundary portion of the object have been matched, calculate an objective function to be applied to each of mask heads based on the first and second result information and parameter information for the first and second result information, update all of the mask heads, and perform object recognition based on the updated mask heads, by executing the program stored in the memory, wherein the processor calculates first similarity between a feature vector that is obtained by passing through a first layer of a mask head and a foreground prototype in each pixel of the input image, calculates second similarity between the feature vector and a background prototype, and generates the first result information by applying initial results of object recognition in each pixel of the input image to the first and second similarities.

6. The electronic device of claim 5, wherein the processor calculates a foreground error of a pixel that is located in a circumference of a bounding box of each object included in the image, extracts a set of pixels having a predetermined number in order that the calculated foreground error is high, and calculates the background prototype based on a feature vector of the set of extracted pixels.

7. The electronic device of claim 5, wherein the processor applies information on a set of pixels in which a minimum value between a foreground error and a background error is greater than a predetermined threshold to the calculated first similarity.

8. The electronic device of claim 5, wherein the processor generates a set of pixels that neighbor a predetermined pixel that enters the mask head as an input, calculates third similarity between the predetermined pixel and neighboring pixels within the generated set of pixels, and matches the results of object recognition and the boundary portion based on whether the calculated third similarity is greater than a predetermined threshold.

* * * * *